US00RE39439E

(19) United States
(12) Reissued Patent
Pervan

(10) Patent Number: US RE39,439 E
(45) Date of Reissued Patent: Dec. 26, 2006

(54) SYSTEM FOR JOINING BUILDING BOARDS

(75) Inventor: Tony Pervan, Solna (SE)

(73) Assignee: Valinge Aluminium AB, Viken (SE)

(21) Appl. No.: 09/343,696

(22) PCT Filed: Apr. 29, 1994

(86) PCT No.: PCT/SE94/00386

§ 371 (c)(1),
(2), (4) Date: May 17, 1995

(87) PCT Pub. No.: WO94/26999

PCT Pub. Date: Nov. 24, 1994

Related U.S. Patent Documents

Reissue of:
(64) Patent No.: 5,706,621
Issued: Jan. 13, 1998
Appl. No.: 08/436,224
Filed: May 17, 1995

(30) Foreign Application Priority Data

May 10, 1993 (SE) ..... 9301595

(51) Int. Cl.
*E04F 15/22* (2006.01)

(52) U.S. Cl. ..... 52/403.1; 52/480; 52/506.05; 52/551; 52/590.2; 52/591.3; 52/591.5; 52/592.2

(58) Field of Classification Search ..... 52/309.8, 52/403.1, 480, 506.05, 506.01, 587.1, 589.1, 52/591.1, 592.1, 591.3, 592.2, 590.2, 591.4, 52/591.5; 272/3
See application file for complete search history.

(56) References Cited

U.S. PATENT DOCUMENTS 1,988,201 A * 1/1935 Hall ..... 52/550 X
3,538,665 A * 11/1970 Gohner
4,169,688 A * 10/1979 Toshio ..... 404/40
4,304,083 A 12/1981 Anderson
4,819,932 A * 4/1989 Trotter, Jr. ..... 472/92

(Continued)

FOREIGN PATENT DOCUMENTS

| | | | |
|---|---|---|---|
| DE | 26 16 077 | * | 10/1977 |
| DE | 35 38 538 A1 | | 5/1987 |
| DE | 41 30 115 A1 | | 3/1993 |
| FR | 1293043 | * | 4/1962 |
| SE | 450 141 | * | 6/1987 |
| WO | WO 93/13280 | * | 7/1993 |

OTHER PUBLICATIONS

United States Court of Appeals for the Federal Circuit Decision in *Alloc, Inc. et al* v. *International Trade Commission and Pergo, Inc. et al.*, decided Sep. 10, 2003.

U.S. Court of Appeals for the Federal Circuit, 02–1222,–1291, *Alloc, Inc.* v. *International Trade Commission,* pp. 1–32.

*Primary Examiner*—Carl D. Friedman
*Assistant Examiner*—Yvonne M. Horton
(74) *Attorney, Agent, or Firm*—Buchanan Ingersoll P.C.

(57) ABSTRACT

The invention relates to a system for laying and mechanically joining building panels, especially thin, hard, floating floors. Adjacent joint edges (3, 4) of two panels (1, 2) engage each other to provide a first mechanical connection locking the joint edges (3, 4) in a first direction (D1) perpendicular to the principal plane of the panels. In each joint, there is further provided a strip (6) which is integrated with one joint edge (3) and which projects behind the other joint edge (4). The strip (6) has an upwardly protruding locking element (8) engaging in a locking groove (14) in the rear side (16) of the other joint edge (4) to form a second mechanical connection locking the panels (1, 2) in a second direction (D2) parallel to the principal plane of the panels and at right angles to the joint. Both the first and the second mechanical connections allow mutual displacement of joined panels (1, 2) in the direction of the joint.

43 Claims, 6 Drawing Sheets

U.S. PATENT DOCUMENTS 5,029,425 A * 7/1991 Bogataj ..... 52/551 X
5,148,850 A 9/1992 Urbanick
5,860,267 A * 1/1999 Pervan ..... 52/748.1
6,023,907 A * 2/2000 Pervan ..... 52/748.1
6,205,639 B1 * 3/2001 Pervan ..... 29/509
6,324,803 B1 * 12/2001 Pervan ..... 52/403.1
6,446,405 B1 * 9/2002 Pervan ..... 52/403.1
6,510,665 B1 * 1/2003 Pervan ..... 52/589.1
6,516,579 B1 * 2/2003 Pervan ..... 52/403.1
6,532,709 B1 * 3/2003 Pervan ..... 52/403.1
2002/0178673 A1 * 12/2002 Pervan ..... 52/385
2002/0178674 A1 * 12/2002 Pervan ..... 52/385
2002/0178682 A1 * 12/2002 Pevan ..... 52/592.1

* cited by examiner

SYSTEM FOR JOINING BUILDING BOARDS

Matter enclosed in heavy brackets [ ] appears in the original patent but forms no part of this reissue specification; matter printed in italics indicates the additions made by reissue.

TECHNICAL FIELD

The invention generally relates to a system for providing a joint along adjacent joint edges of two building panels, especially floor panels.

More specifically, the joint is of the type where the adjacent joint edges together form a first mechanical connection locking the joint edges to each other in a first direction at right angles to the principal plane of the panels, and where a locking device forms a second mechanical connection locking the panels to each other in a second direction parallel to the principal plane and at right angles to the joint edges, the locking device comprising a locking groove which extends parallel to and spaced from the joint edge of one of the panels, and said locking groove being open at the rear side of this one panel.

The invention is especially well suited for use in joining floor panels, especially thin laminated floors. Thus, the following description of the prior art and of the objects and features of the invention will be focused on this field of use. It should however be emphasised that the invention is useful also for joining ordinary wooden floors as well as other types of building panels, such as wall panels and roof slabs.

BACKGROUND OF THE INVENTION

A joint of the aforementioned type is known e.g. from SE 450,141. The first mechanical connection is achieved by means of joint edges having tongues and grooves. The locking device for the second mechanical connection comprises two oblique locking grooves, one in the rear side of each panel, and a plurality of spaced-apart spring clips which are distributed along the joint and the legs of which are pressed into the grooves, and which are biased so as to tightly clamp the floor panels together. Such a joining technique is especially useful for joining thick floor panels to form surfaces of a considerable expanse.

Thin floor panels of a thickness of about 7–10 mm, especially laminated floors, have in a short time taken a substantial share of the market. All thin floor panels employed are laid as "floating floors" without being attached to the supporting structure. As a rule, the dimension of the floor panels is 200×1200 mm, and their long and short sides are formed with tongues and grooves. Traditionally, the floor is assembled by applying glue in the groove and forcing the floor panels together. The tongue is then glued in the groove of the other panel. As a rule, a laminated floor consists of an upper decorative wear layer of laminate having a thickness of about 1 mm, an intermediate core of particle board or other board, and a base layer to balance the construction. The core has essentially poorer properties than the laminate, e.g. in respect of hardness and water resistance, but it is nonetheless needed primarily for providing a groove and tongue for assemblage. This means that the overall thickness must be at least about 7 mm. These known laminated floors using glued tongue-and-groove joints however suffer from several inconveniences.

First, the requirement of an overall thickness of at least about 7 mm entails an undesirable restraint in connection with the laying of the floor, since it is easier to cope with low thresholds when using thin floor panels, and doors must often be adjusted in height to come clear of the floor laid. Moreover, manufacturing costs are directly linked with the consumption of material.

Second, the core must be made of moisture-absorbent material to permit using water-based glues when laying the floor. Therefore, it is not possible to make the floors thinner using so-called compact laminate, because of the absence of suitable gluing methods for such non-moisture-absorbent core materials.

Third, since the laminate layer of the laminated floors is highly wear-resistant, tool wear is a major problem when working the surface in connection with the formation of the tongue.

Fourth, the strength of the joint, based on a glued tongue-and-groove connection, is restricted by the properties of the core and of the glue as well as by the depth and height of the groove. The laying quality is entirely dependent on the gluing. In the event of poor gluing, the joint will open as a result of the tensile stresses which occur e.g. in connection with a change in air humidity.

Fifth, laying a floor with glued tongue-and-groove joints is time-consuming, in that glue must be applied to every panel on both the long and short sides thereof.

Sixth, it is not possible to disassemble a glued floor once laid, without having to break up the joints. Floor panels that have been taken up cannot therefore be used again. This is a drawback particularly in rental houses where the flat concerned must be put back into the initial state of occupancy. Nor can damaged or worn-out panels be replaced without extensive efforts, which would be particularly desirable on public premises and other areas where parts of the floor are subjected to great wear.

Seventh, known laminated floors are not suited for such use as involves a considerable risk of moisture penetrating down into the moisture-sensitive core.

Eighth, present-day hard, floating floors require, prior to laying the floor panels on hard subfloors, the laying of a separate underlay of floor board, felt, foam or the like, which is to damp impact sounds and to make the floor more pleasant to walk on. The placement of the underlay is a complicated operation, since the underlay must be placed in edge-to-edge fashion. Different under-lays affect the properties of the floor.

There is thus a strongly-felt need to overcome the above-mentioned drawbacks of the prior art. It is however not possible simply to use the known joining technique with glued tongues and grooves for very thin floors, e.g. with floor thicknesses of about 3 mm, since a joint based on a tongue-and-groove connection would not be sufficiently strong and practically impossible to produce for such thin floors. Nor are any other known joining techniques usable for such thin floors. Another reason why the making of thin floors from e.g. compact laminate involves problems is the thickness tolerances of the panels, being about 0.2–0.3 mm for a panel thickness of about 3 mm. A 3-mm compact laminate panel having such a thickness tolerance would have, if ground to uniform thickness on its rear side, an unsymmetrical design, entailing the risk of bulging. Moreover, if the panels have different thicknesses, this also means that the joint will be subjected to excessive load.

Nor is it possible to overcome the above-mentioned problems by using double-adhesive tape or the like on the undersides of the panels, since such a connection catches directly and does not allow for subsequent adjustment of the panels as is The case with ordinary gluing.

Using U-shaped clips of the type disclosed in the above-mentioned SE 450,141, or similar techniques, to overcome the drawbacks discussed above is no viable alternative either. Especially, biased clips of this type cannot be used for joining panels of such a small thickness as 3 mm. Normally, it is not possible to disassemble the floor panels without having access to their undersides. This known technology relying on clips suffers from the additional drawbacks:

Subsequent adjustment of the panels in their longitudinal direction is a complicated operation in connection with laying, since the clips urge the panels tightly against each other.

Floor laying using clips is time-consuming.

This technique is usable only in those cases where the floor panels are resting on underlying joists with the clips placed therebetween. For thin floors to be laid on a continuous, flat supporting structure, such clips cannot be used.

The floor panels can be joined together only at their long sides. No clip connection is provided on the short sides.

Technical Problems and Objects of the Invention

A main object of the invention therefore is to provide a system for joining together building panels, especially floor panels for hard, floating floors, which allows using floor panels of a smaller overall thickness than present-day floor panels.

A particular object of the invention is to provide a panel-joining system which makes it possible in a simple, cheap and rational way to provide a joint between floor panels without requiring the use of glue, especially a joint based primarily only on mechanical connections between the panels;

can be used for joining floor panels which have a smaller thickness than present-day laminated floors and which have, because of the use of a different core material, superior properties than present-day floors even at a thickness of 3 mm;

makes it possible between thin floor panels to provide a joint that eliminates any unevennesses in the joint because of thickness tolerances of the panels;

allows joining all the edges of the panels;

reduces tool wear when manufacturing floor panels with hard surface layers;

allows repeated disassembly and reassembly of a floor previously laid, without causing damage to the panels, while ensuring high laying quality;

makes it possible to provide moisture-proof floors;

makes it possible to obviate the need of accurate, separate placement of an underlay before laying the floor panels; and considerably cuts the time for joining the panels.

These and other objects of the invention are achieved by means of a panel-joining system having the features recited in the appended claims.

Thus, the invention provides a system for making a joint along adjacent joint edges of two building panels, especially floor panels, in which joint:

the adjacent joint edges together form a first mechanical connection locking the joint edges to each other in a first direction at right angles to the principal plane of the panels, and a locking device arranged on the rear side of the panels forms a second mechanical connection locking the panels to each other in a second direction parallel to the principal plane and at right angles to the joint edges, said locking device comprising a locking groove which extends parallel to and spaced from the joint edge of one of said panels, termed groove panel, and which is open at the rear side of the groove panel, said system being characterised in that the locking device further comprises a strip integrated with the other of said panels, termed strip panel, said strip extending throughout substantially the entire length of the joint edge of the strip panel and being provided with a locking element projecting from the strip, such that when the panels are joined together, the strip projects on the rear side of the groove panel with its locking element received in the locking groove of the groove panel, that the panels, when joined together, can occupy a relative position in said second direction where a play exists between the locking groove and a locking surface on the locking element that is facing the joint edges and is operative in said second mechanical connection, that the first and the second mechanical connection both allow mutual displacement of the panels in the direction of the joint edges, and that the second mechanical connection is so conceived as to allow the locking element to leave the locking groove if the groove panel is turned about its joint edge angularly away from the strip.

The term "rear side" as used above should be considered to comprise any side of the panel located behind/underneath the front side of the panel. The opening plane of the locking groove of the groove panel can thus be located at a distance from the rear surface of the panel resting on the supporting structure. Moreover, the strip, which in the invention extends throughout substantially the entire length of the joint edge of the strip panel, should be considered to encompass both the case where the strip is a continuous, uninterrupted element, and the case where the "strip" consists in its longitudinal direction of several parts, together covering the main portion of the joint edge.

It should also be noted (i) that it is the first and the second mechanical connection as such that permit mutual displacement of the panels in the direction of the joint edges, and that (ii) it is the second mechanical connection as such that permits the locking element to leave the locking groove if the groove panel is turned about its joint edge angularly away from the strip. Within the scope of the invention, there may thus exist means, such as glue and mechanical devices, that can counteract or prevent such displacement and/or upward angling.

The system according to the invention makes it possible to provide concealed, precise locking of both the short and long sides of the panels in hard, thin floors. The floor panels can be quickly and conveniently disassembled in the reverse order of laying without any risk of damage to the panels, ensuring at the same time a high laying quality. The panels can be assembled and disassembled much faster than in present-day systems, and any damaged or worn-out panels can be replaced by taking up and re-laying parts of the floor.

According to an especially preferred embodiment of the invention, a system is provided which permits precise joining of thin floor panels having, for example, a thickness of the order of 3 mm and which at the same time provides a tolerance-independent smooth top face at the joint. To this end, the strip is mounted in an [equalising] *equalizing* groove which is countersunk in the rear side of the strip panel and which exhibits an exact, predetermined distance from its bottom to the front side of the strip panel. The part of the strip projecting behind the groove panel engages a corresponding [equalising] *equalizing* groove, which is countersunk in the rear side of the groove panel and which exhibits the same exact, predetermined distance from its bottom to the front side of the groove panel. The thickness of the strip then is at least so great that the rear side of the strip is flush with, and preferably projects slightly below the rear side of the panels. In this embodiment, the panels will always rest, in the joint, with their [equalising] *equalizing* grooves on a strip. This levels out the tolerance and imparts the necessary strength to the joint. The strip transmits horizontal and upwardly-directed forces to the panels and down-wardly-directed forces to the existing subfloor.

Preferably, the strip may consist of a material which is flexible, resilient and strong, and can be sawn. A preferred strip material is sheet aluminum. In an aluminum strip, sufficient strength can be achieved with a strip thickness of the order of 0.5 mm.

In order to permit taking up previously laid, joined floor panels in a simple way, a preferred embodiment of the invention is characterised in that when the groove panel is pressed against the strip panel in the second direction and is turned angularly away from the strip, the maximum distance between the axis of rotation of the groove panel and the locking surface of the locking groove closest to the joint edges is such that the locking element can leave the locking groove without contacting the locking surface of the locking groove. Such a disassembly can be achieved even if the aforementioned play between the locking groove and the locking surface is not greater than 0.2 mm.

According to the invention, the locking surface of the locking element is able to provide a sufficient locking function even with very small heights of the locking surface. Efficient locking of 3-mm floor panels can be achieved with a locking surface that is as low as 2 mm. Even a 0.5-mm-high locking surface may provide sufficient locking. The term "locking surface" as used herein relates to the part of the locking element engaging the locking groove to form the second mechanical connection.

For optimal function of the invention, the strip and the locking element should be formed on the strip panel with high precision. Especially, the locking surface of the locking element should be located at an exact distance from the joint edge of the strip panel.

Furthermore, the extent of the engagement in the floor panels should be minimised, since it reduces the floor strength.

By known manufacturing methods, it is possible to produce a strip with a locking pin, for example by extruding aluminium or plastics into a suitable section, which is thereafter glued to the floor panel or is inserted in special grooves. These and all other traditional methods do however not ensure optimum function and an optimum level of economy. To produce the joint system according to the invention, the strip is suitably formed from sheet aluminium, and is mechanically fixed to the strip panel.

The laying of the panels can be performed by first placing the strip panel on the subfloor and then moving the groove panel with its long side up to the long side of the strip panel, at an angle between the principal plane of the groove panel and the subfloor. When the joint edges have been brought into engagement with each other to form the first mechanical connection, the groove panel is angled down so as to accommodate the locking element in the locking groove.

Laying can also be performed by first placing both the strip panel and the groove panel flat on the subfloor and then joining the panels parallel to their principal planes while bending the strip downwards until the locking element snaps up into the locking groove. This laying technique enables in particular mechanical locking of both the short and long sides of the floor panels. For example, the long sides can be joined together by using the first laying technique with downward angling of the groove panel, while the short sides are subsequently joined together by displacing the groove panel in its longitudinal direction until its short side is pressed on and locked to the short side of an adjacent panel in the same row.

In connection with their manufacture, the floor panels can be provided with an underlay of e.g. floor board, foam or felt. The underlay should preferably cover the strip such that the joint between the underlays is offset in relation to the joint between the floor panels.

The above and other features and advantages of the invention will appear from The appended claims and the following description of embodiments of the invention.

The invention will now be described in more detail hereinbelow with reference to the accompanying drawing Figures.

DESCRIPTION OF DRAWINGS FIGURES

FIGS. 1a and 1b schematically show in two stages how two floor panels of different thickness are joined together in floating fashion according to a first embodiment of the invention.

FIGS. 2a–c show in three stages a method for mechanically joining two floor panels according to a second embodiment of the invention.

FIGS. 3a–c show in three stages another method for mechanically joining the floor panels of FIGS. 2a–c.

DESCRIPTION OF PREFERRED EMBODIMENTS

Figure 1A:
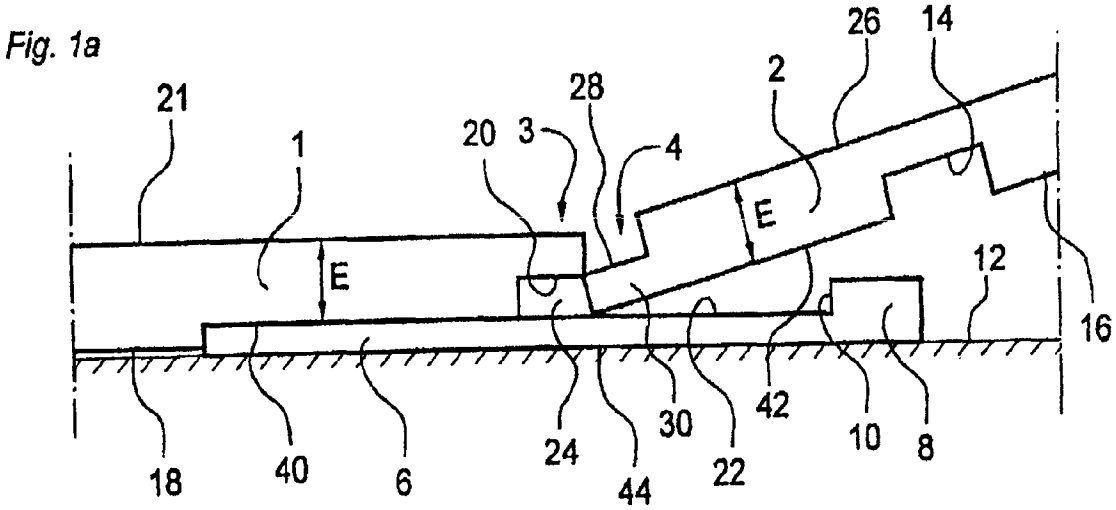
Figure 1B:
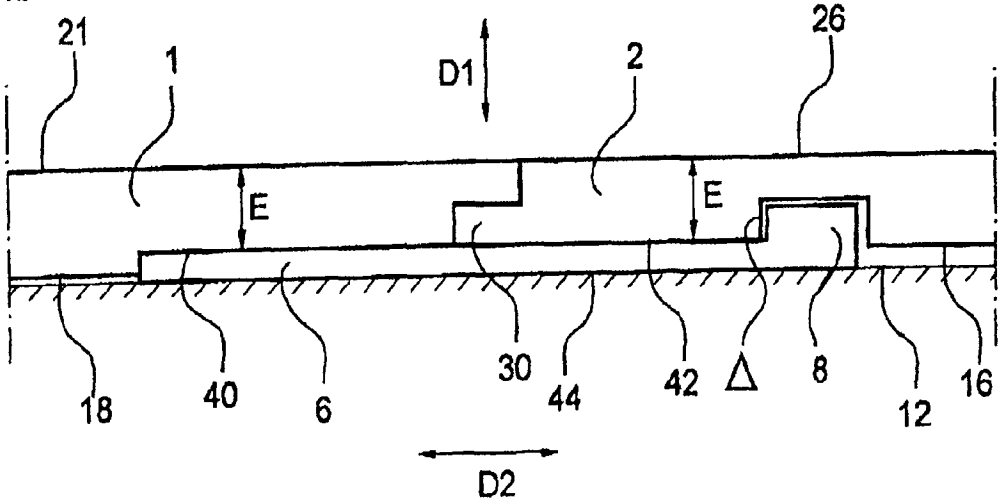

FIGS. 1a and 1b, to which reference is now made, illustrate a first floor panel 1, hereinafter termed strip panel, and a second floor panel 2, hereinafter termed groove panel. The terms "strip panel" and "groove panel" are merely intended to facilitate the description of the invention, the panels 1, 2 normally being identical in practice. The panels 1 and 2 may be made from compact laminate and may have a thickness of about 3 mm with a thickness tolerance of about ±0.2 mm. Considering this thickness tolerance, the panels 1, 2 are illustrated with different Thicknesses (FIG. 1b), the strip panel 1 having a maximum thickness (3.2 mm) and the groove panel 2 having a minimum thickness (2.8 mm).

To enable mechanical joining of the panels 1, 2 at opposing joint edges, generally designated 3 and 4, respectively, the panels are provided with grooves and strips as described in the following.

Figure 4A:
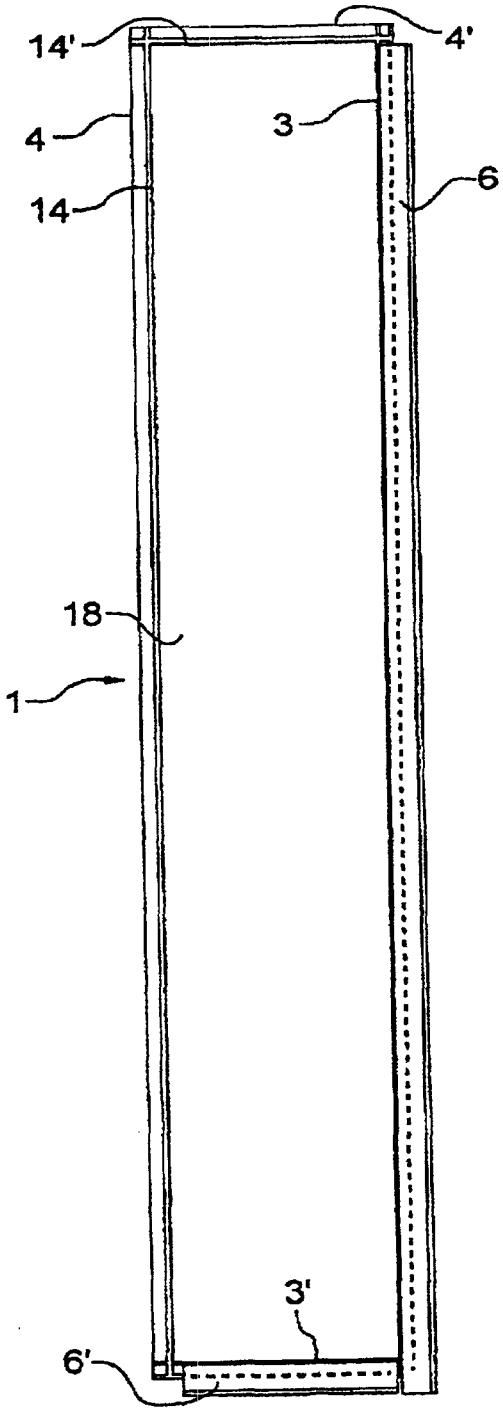
FIGS. 4a and 4b show a floor panel according to FIGS. 2a–c as seen from below and from above, respectively.
Figure 4B:
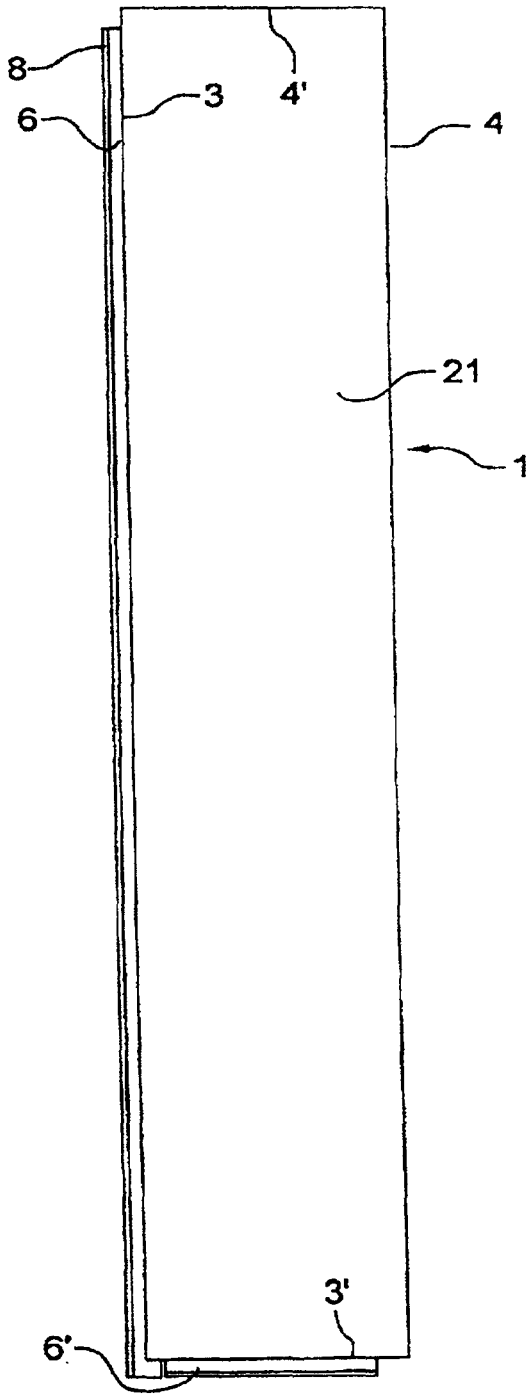

Reference is now made primarily to FIGS. 1a and 1b, and secondly to FIGS. 4a and 4b showing the basic design of the floor panels from below and from above, respectively.

From the joint edge 3 of the strip panel 1, i.e. the one long side, projects horizontally a flat strip 6 mounted at the factory on the underside of the strip panel 1 and extending throughout the entire joint edge 3. The strip 6, which is made of flexible, resilient sheet aluminium, can be fixed mechanically, by means of glue or in any other suitable way. In FIGS. 1a and 1b, the strip 6 is glued, while in FIGS. 4a and 4b it is mounted by means of a mechanical connection, which will be described in more detail hereinbelow.

Other strip materials can be used, such as sheets of other metals, as well as aluminium or plastics sections. Alternatively, the strip 6 may be integrally formed with the strip panel 1. At any rate, the strip 6 should be integrated with the strip panel 1, i.e. it should not be mounted on the strip panel 1 in connection with laying. As a non-restrictive example, the strip 6 may have a width of about 30 mm and a thickness of about 0.5 mm.

As appears from FIGS. 4a and 4b, a similar, although shorter strip 6' is provided also at one short side 3' of the strip panel 1. The shorter strip 6' does however not extend throughout the entire short side 3' but is otherwise identical with the strip 6 and, therefore, is not described in more detail here.

The edge of the strip 6 facing away from the joint edge 3 is formed with a locking element 8 extended throughout The entire strip 6. The locking element 8 has a locking surface 10 facing the joint edge 3 and having a height of e.g. 0.5 mm. The locking element 8 is so designed that when the floor is being laid and the strip panel 2 of FIG. 1a is pressed with its joint edge 4 against the joint edge 3 of the strip panel 1 and is angled down against the subfloor 12 according to FIG. 1b, it enters a locking groove 14 formed in the underside of the groove panel 2 and extending parallel to and spaced from the joint edge 4. In FIG. 1b, the locking element 8 and the locking groove 14 together form a mechanical connection locking the panels 1, 2 to each other in the direction designated D2. More specifically, the locking surface 10 of the locking element 8 serves as a stop with respect to the surface of the locking groove 14 closest to the joint edge 4.

When the panels 1 and 2 are joined together, they can however occupy such a relative position in the direction D2 that there is a small play Δ between the locking surface 10 and the locking groove 14. This mechanical connection in the direction D2 allows mutual displacement of the panels 1, 2 in the direction of the joint, which considerably facilitates the laying and enables joining together the short sides by snap action.

As appears from FIGS. 4a and 4b, each panel in the system has a strip 6 at one long side 3 and a locking groove 14 at the other long side 4, as well as a strip at one short side 3' and a locking groove 14' at the other short side 4'.

Furthermore, the joint edge 3 of the strip panel 1 has in its underside 18 a recess 20 extending throughout the entire joint edge 3 and forming together with the upper face 22 of the strip 6 a laterally open recess 24. The joint edge 4 of the groove panel 2 has in its top side 26 a corresponding recess 28 forming a locking tongue 30 to be accommodated in the recess 24 so as to form a mechanical connection locking the joint edges 3, 4 to each other in the direction designated D1. This connection can be achieved with other designs of the joint edges 3, 4, for example by a bevel thereof such that the joint edge 4 of the groove panel 2 passes obliquely in underneath the joint edge 3 of the strip panel 1 to be locked between that edge and the strip 6.

The panels 1, 2 can be taken up in the reverse order of laying without causing any damage to the joint, and be laid again.

The strip 6 is mounted in a tolerance-equalizing groove 40 in the underside 18 of the strip panel 1 adjacent the joint edge 3. In this embodiment, the width of the equalizing groove 40 is approximately equal to half the width of the strip 6, i.e. about 15 mm. By means of the equalizing groove 40, it is ensured that there will always exist between the top side 21 of the panel 1 and the bottom of the groove 40 an exact, predetermined distance E which is slightly smaller than the minimum thickness (2.8 mm) of the floor panels 1, 2. The groove panel 2 has a corresponding tolerance-equalizing surface or groove 42 in the underside 16 of the joint edge 4. The distance between the equalizing surface 42 and the top side 26 of the groove panel 2 is equal to the aforementioned exact distance E. Further, the thickness of the strip 6 is so chosen that the underside 44 of the strip is situated slightly below the undersides 18 and 16 of the floor panels 1 and 2, respectively. In this manner, the entire joint will rest on the strip 6, and all vertical downwardly-directed forces will be efficiently transmitted to the subfloor 12 without any stresses being exerted on the joint edges 3, 4. Thanks to the provision of the equalizing grooves 40, 42, an entirely even joint will be achieved on the top side, despite the thickness tolerances of the panels 1, 2, without having to perform any grinding or the like across the whole panels. Especially, this obviates the risk of damage to the bottom layer of the compact laminate, which might give rise to bulging of the panels.

Figure 2A:
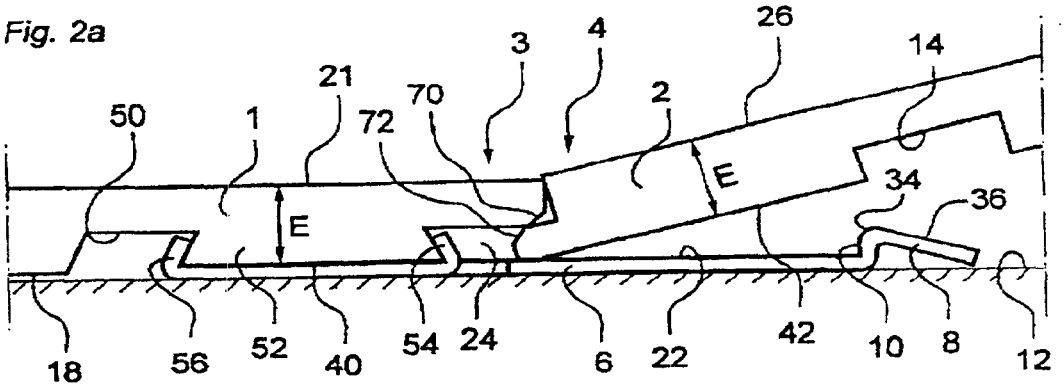
Figure 2B:
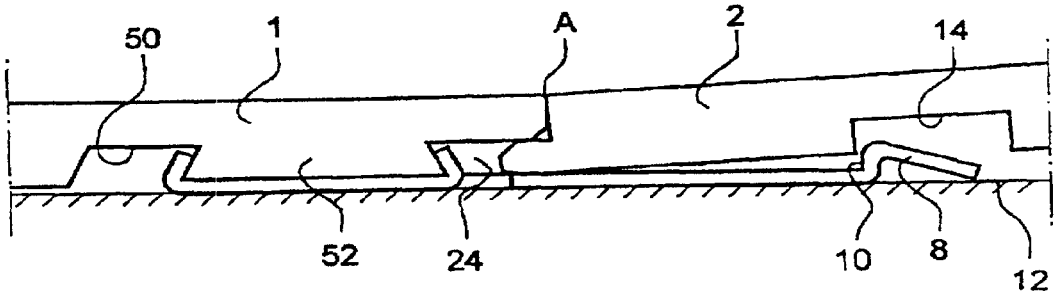
Figure 2C:
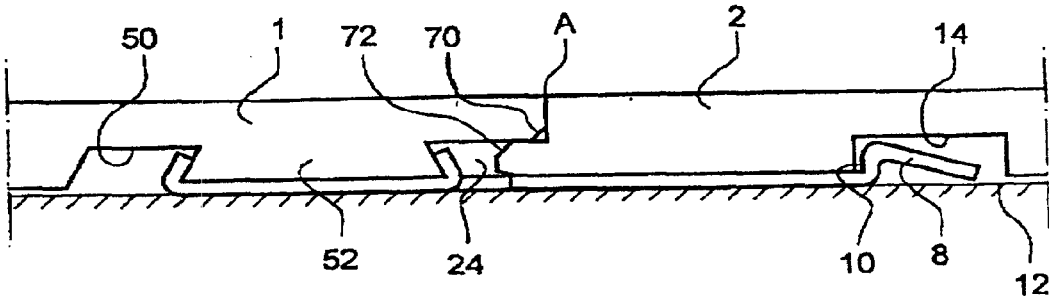

Reference is now made to the embodiment of FIGS. 2a–c showing in a succession substantially the same laying method as in FIGS. 1a and 1b. The embodiment of FIGS. 2a–c primarily differs from the embodiment of FIGS. 1a and 1b in that the strip 6 is mounted on the strip panel 1 by means of a mechanical connection instead of glue. To provide this mechanical connection, illustrated in more detail in FIG. 6, a groove 50 is provided in the underside 18 of the strip panel 1 at a distance from the recess 24. The groove 50 may be formed either as a continuous groove extending throughout the entire length of the panel 1, or as a number of separate grooves. The groove 50 defines, together with the recess 24, a dovetail gripping edge 52, the underside of which exhibits an exact equalizing distance E to the top side 21 of the strip panel 1. The aluminium strip 6 has a number of punched and bent tongues 54, as well as one or more lips 56 which are bent round opposite sides of the gripping edge 52 in clamping engagement therewith. This connection is shown in detail from below in the perspective view of FIG. 6.

Figure 7:
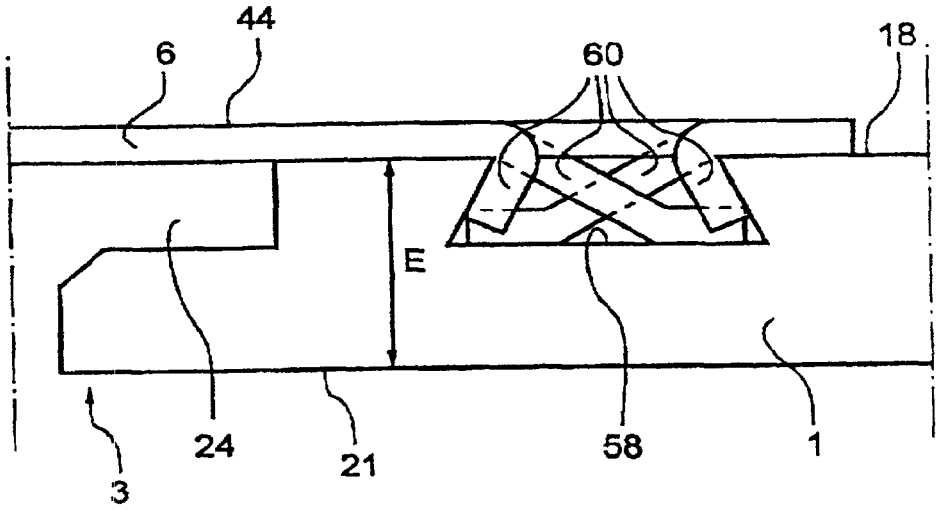
FIG. 7 shows in section a second variant for mounting a strip on a floor panel.

Alternatively, a mechanical connection between the strip 6 and the strip panel 1 can be provided as illustrated in FIG. 7 showing in section a cut-away part of the strip panel 1 turned upside down. In FIG. 7, the mechanical connection comprises a dovetail recess 58 in the underside 18 of the strip panel 1, as well as tongues/lips 60 punched and bent from the strip 5 and clamping against opposing inner sides of the recess 58.

The embodiment of FIGS. 2a–c is further characterized in that the locking element 8 of the strip 6 is designed as a component bent from the aluminium sheet and having an operative locking surface 10 extending at right angles up from the front side 22 of the strip 6 through a height of e.g. 0.5 mm, and a rounded guide surface 34 facilitating the insertion of the locking element 8 into the locking groove 14 when angling down the groove panel 2 towards The subfloor 12 (FIG. 2b), as well as a portion 36 which is inclined towards the subfloor 12 and which is not operative in the laying method illustrated in FIGS. 2a–c.

Further, it can be seen from FIGS. 2a–c that the joint edge 3 of the strip panel 1 has a lower bevel 70 which cooperates during laying with a corresponding upper bevel 72 of the joint edge 4 of the groove panel 2, such that the panels 1 and 2 are forced to move vertically towards each other when their joint edges 3, 4 are moved up to each other and the panels are pressed together horizontally.

Preferably, the locking surface 10 is so located relative to the joint edge 3 that when the groove panel 2, starting from the joined position in FIG. 2c, is pressed horizontally in the direction D2 against the strip panel 1 and is turned angularly up from the strip 6, the maximum distance between the axis of rotation A of the groove panel 2 and the locking surface 10 of the locking groove is such that the locking element 8 can leave The locking groove 14 without coming into contact with it.

Figure 3A:
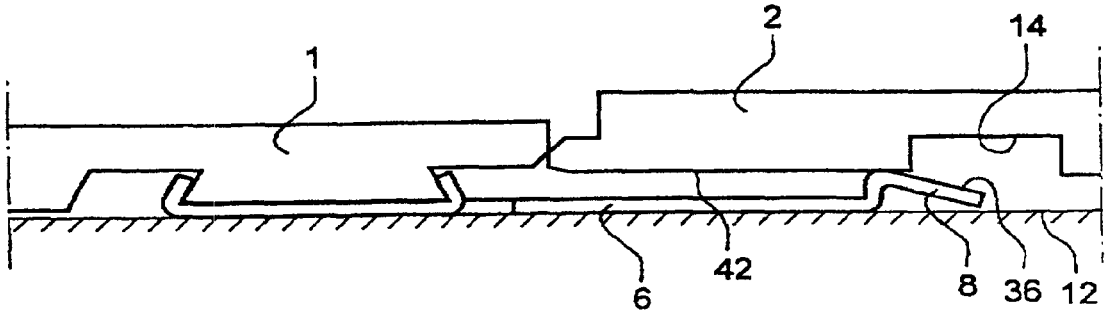
Figure 3B:
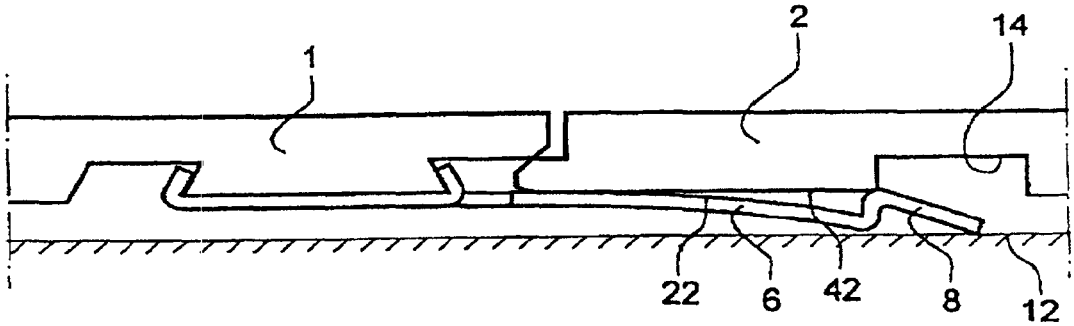
Figure 3C:
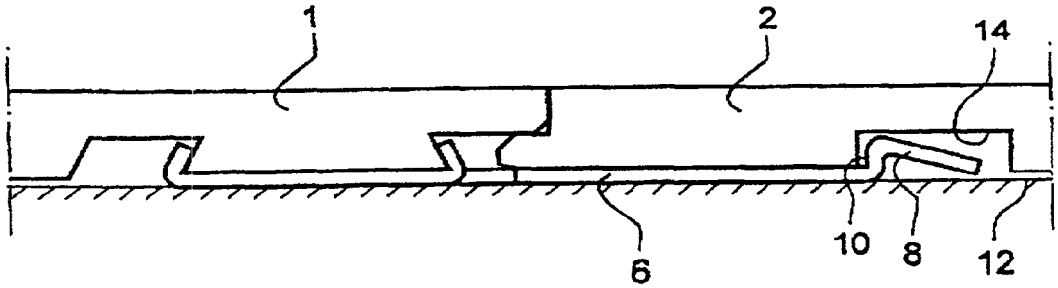

FIGS. 3a–3b show another joining method for mechanically joining together the floor panels of FIGS. 2a–c. The method illustrated in FIGS. 3a–c relies on the fact that the strip 6 is resilient and is especially useful for joining together the short sides of floor panels which have already been joined along one long side as illustrated in FIGS. 2a–c. The method of FIGS. 3a–c is performed by first placing the two panels 1 and 2 flat on the subfloor 12 and then moving them horizontally towards each other according to FIG. 3b. The inclined portion 36 of the locking element 8 then serves as a guide surface which guides the joint edge 4 of the groove panel 2 up on to the upper side 22 of the strip 6. The strip 6 will then be urged downwards while the locking element 8 is sliding on the equalizing surface 42. When the joint edges 3, 4 have been brought into complete engagement with each other horizontally, the locking element 8 will snap into the locking groove 14 (FIG. 3c), thereby providing the same locking as in FIG. 2c. The same locking method can also be used by placing, in the initial position, the joint edge 4 of the groove panel with the equalizing groove 42 on the locking element 10 (FIG. 3a). The inclined portion 36 of the locking element 10 then is not operative. This technique thus makes it possible to lock the floor panels mechanically in all directions, and by repeating the laying operations the whole floor can be laid without using any glue.

The invention is not restricted to the preferred embodiments described above and illustrated in the drawings, but several variants and modifications thereof are conceivable within the scope of the appended claims. The strip 6 can be divided into small sections covering the major part of the joint length. Further, the thickness of the strip 6 may vary throughout its width. All strips, locking grooves, locking elements and recesses are so dimensioned as to enable laying the floor panels with flat top sides in a manner to rest on the strip 6 in the joint. If the floor panels consist of compact laminate and if silicone or any other sealing compound, a rubber strip or any other sealing device is applied prior to laying between the flat projecting part of the strip 6 and the groove panel 2 and/or in the recess 26, a moisture-proof floor is obtained.

Figure 6:
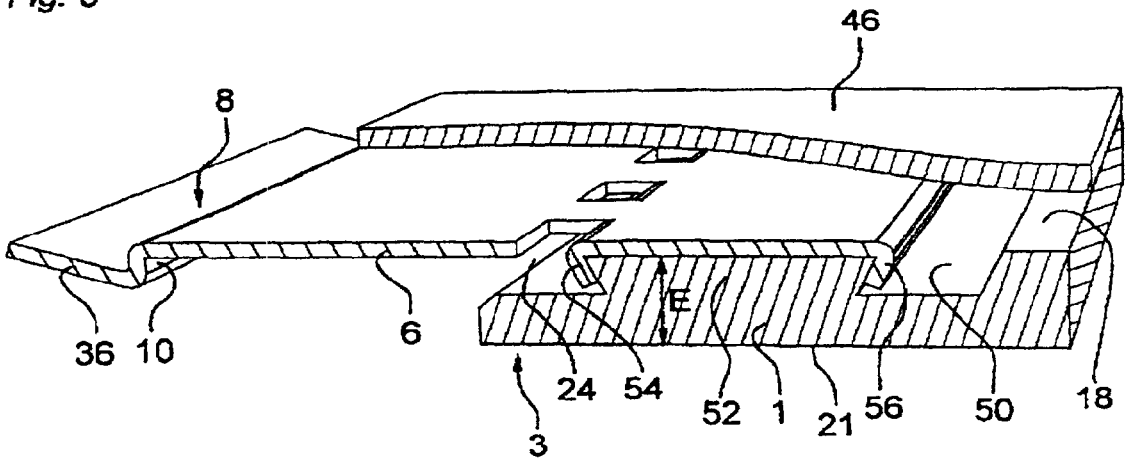
FIG. 6 shows in perspective and from below a first variant for mounting a strip on a floor panel.

As appears from FIG. 6, an underlay 46, e.g of floor board, foam or felt, can be mounted on the underside of the panels during the manufacture thereof. In one embodiment, the underlay 45 covers the strip 6 up to the locking element 8, such that the joint between the underlays 46 becomes offset in relation to the joint between the joint edges 3 and 4.

Figure 5:
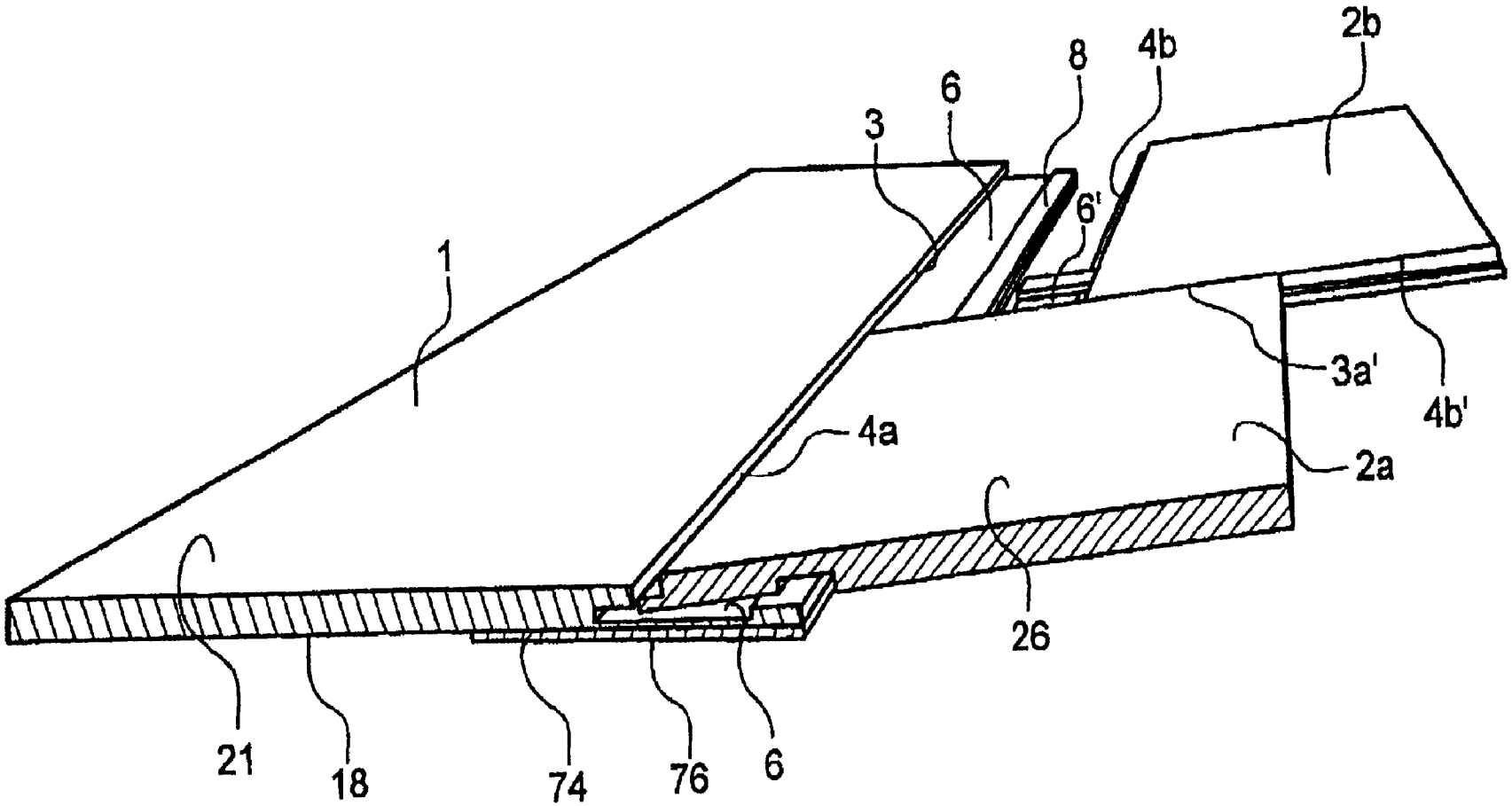
FIG. 5 illustrates in perspective a method for laying and joining floor panels according to a third embodiment of the invention.

In the embodiment of FIG. 5, the strip 6 and its locking element 8 are integrally formed with the strip panel 1, the projecting part of the strip 6 thus forming an extension of the lower part of the joint edge 3. The locking function is the same as in the embodiments described above. On the underside 18 of the strip panel 1, there is provided a separate strip, band or the like 74 extending throughout the entire length of the joint and having, in this embodiment, a width covering approximately the same surface as the separate strip 6 of the previous embodiments. The strip 74 can be provided in directly on the rear side 18 or in a recess formed therein (not shown), so that the distance from the front side 21, 26 of the floor to the rear side 76, including the thickness of the strip 74, always is at least equal to the corresponding distance in the panel having the greatest thickness tolerance. The panels 1, 2 will then rest, in the joint, on the strip 74 or only on the undersides 18, 16 of the panels, if these sides are made plane.

When using a material which does not permit downward bending of the strip 6 or the locking element 8, laying can be performed in the way shown in FIG. 5. A floor panel 2a is moved angled upwardly with its long side 4a into engagement with the long side 3 of a previously laid floor panel 1 while at the same time a third floor panel 2b is moved with its short side 4b' into engagement with the short side 3a' of the upwardly-angled floor panel 2a and is fastened by angling the panel 2b downwards. The panel 2b is then pushed along the short side 3a' of the upwardly-angled floor panel 2a until its long side 4b encounters the long side 3 of The initially-laid panel 1. The two upwardly-angled panels 2a and 2b are therefore angled down on to the subfloor 12 so as to bring about locking.

By a reverse procedure the panels can be taken up in The reverse order of laying without causing any damage to the joint, and be laid again.

Several variants of preferred laying methods are conceivable. For example, the strip panel can be inserted under the groove panel, thus enabling the laying of panels in all four directions with respect to the initial position.

What is claimed:

1. A system for providing a joint between adjacent building panels, comprising:

each of said building panels including a first edge and a second edge such that the first edge of each of said building panels forms a first mechanical connection with the second end of an adjacent one of the building panels locking the first and second edges of the building panels to each other in a first direction at right angles to a principal plane of the panels, and a locking device arranged on a rear side of the building panels forming a second mechanical connection locking the building panels to each other in a second direction parallel to the principal plane and at right angles to the first and second edges, said locking device fitting within a locking groove extending parallel to and spaced apart from the first edge of said building panels, and which locking groove is open at the rear side of the building panels, the locking device comprising a strip integrated with the second edge of each of said building panels, said strip extending throughout substantially an entire length of the second edge and being provided with a locking element projecting from the strip, such that when two adjacent building panels are joined together, the strip projects from the rear side of the second edge of the panels with its locking element received in the locking groove of an adjacent building panel, the building panels, when joined together, can occupy a relative position in said second direction where a play exists between the locking groove and a locking surface on the locking element that is facing the first and second edges and is operative in said second mechanical connection, the first and the second mechanical connections both allow mutual displacement of the building panels in a direction of the first and second edges, and the second mechanical connection enables the locking element to leave the locking groove if the respective building panel is turned about its first edge angularly away from the strip.

2. A system as claimed in claim 1, wherein when the first edge is pressed against the second edge of the adjacent panel in said second direction and is turned angularly away from the strip, the maximum distance between the axis of rotation of the first edge and the locking surface of the locking groove closest to the first and second edges is such that the locking element can leave the locking groove without contacting the locking surface of the locking groove.

3. A system as claimed in claim 1 wherein, the locking surface of the locking element [(22)] is extended from a front side [(22)] of the strip through a height in said first direction that is less than or equal to 2 mm.

4. A system as claimed in claim 1, wherein the first mechanical connection is provided by the first edge engaging, in said first direction, between the second edge of the adjacent panel and a front side of the strip.

5. A system as claimed in claim 1, wherein the strip is made of a material different from that of the panel and fixedly mounted on the panel at the factory.

6. A system as claimed in claim 5, wherein the strip [(6)], at least for one of the two panels, is received in a countersunk groove in the rear side of this one panel.

7. A system as claimed in claim 5, wherein the strip is mounted in an [equalising] *equalizing* groove which is countersunk in the rear side of the panel and exhibits an exact, predetermined distance from its bottom to the front side of the panel, the part of the strip projecting behind the adjacent panel engages a corresponding [equalising] *equalizing* groove which is countersunk in the rear side of the adjacent panel and which exhibits the same exact, predetermined distance from its bottom to the front side of the adjacent panel, and the strip has at least such a thickness that the rear side of the strip is flush with the rear sides of the panels.

8. A system as claimed in claim 7, wherein the strip has such a thickness that it is only partly received in the [equalising] *equalizing* grooves.

9. A system as claimed in claim 5, wherein the strip is fixed to the strip panel by means of a mechanical connection.

10. A system as claimed in claim 9, wherein the mechanical connection between the strip and the panel comprises a gripping edge defined by two recesses in the rear side of the panel, and tongues[,] *and* lips [or the like] which are bent or punched from the strip and which press against opposite outer sides of the gripping edge.

11. A system as claimed in claim 9, wherein the mechanical connection between the strip and the panel comprises a recess in the rear side of the panel, and tongues[,] *and* lips [or the like] which are bent or punched from the strip and which press against opposing inner sides of the recess.

12. A system as claimed in claim 5, wherein the strip is fixed to the panel by means of a binder.

13. A system as claimed in claim 5, wherein the strip is made of a flexible[, preferably] resilient material[, such as sheet aluminum].

14. A system as claimed in claim 1, wherein the locking element consists of a locking edge extended continuously along the strip.

15. A system as claimed in claim 1, wherein the locking element consists of a plurality of spaced-apart locking elements distributed throughout the length of the strip.

16. A system as claimed in claim 1, wherein the panels are rectangular and intended, at each of their four edges, to be joined to a similar panel by a first mechanical connection of the aforementioned type and a second mechanical connection of the aforementioned type, each panel having a first pair of first and second edges, one of which is provided with a strip of the aforementioned type and the other of which is provided with a locking groove of the aforementioned type, and a second pair of opposite first and second edges, one of which is provided with a strip of the aforementioned type and the other of which is provided with a locking groove of the aforementioned type.

17. A system as claimed in claim 1, wherein an underlay of floor boards, foam, *or* felt [or the like] is fixed to the rear sides of the panels.

18. A system as claimed in claim 17, wherein the underlay is fixed so as to cover the strip in said second direction at least up to the locking element, such that a joint between the underlays of the two adjacent panels is offset in said second direction relative to the first and second edges.

19. A system as claimed in any one of the preceding claims, wherein a sealing means[, such as a sealing compound, a rubber strip or the like,] is provided on the front side of the strip between the locking element and the first edge of the strip panel to seal against the adjacent panel.

20. A system as claimed in claim 2, wherein the locking surface of the locking element is extended from the front side of the strip through a height in said first direction that is less than or equal to 2 mm.

21. A system for providing a joint between adjacent building panels, comprising:

each of said building panels including a first edge and a second edge such that the first edge of each of said building panels forms a first mechanical connection with the second edge of an adjacent one of the building panels locking the first and second edges of the building panels to each other in a first direction at right angles to a principal plane of the panels, and a locking device arranged on a rear side of the building panels forming a second mechanical connection locking the building panels to each other in a second direction parallel to the principal plane and at right angles to the first and second edges, said locking device fitting within a locking groove extending parallel to and spaced apart from the first edge of said building panels, and which locking groove is open at the rear side of the building panels, the locking device comprising a strip integrally formed with the second edge of each of said building panels, said strip extending throughout substantially an entire length of the second edge and being provided with a locking element projecting from the strip, such that when two adjacent building panels are joined together, the strip projects from the rear side of the second edge of the panels with its locking element received in the locking groove of an adjacent building panel, the first and the second mechanical connections both allow mutual displacement of the building panels in a direction of the first and second edges, and the second mechanical connection enables the locking element to leave the locking groove if the respective building panel is turned about its first edge angularly away from the strip.

22. A system for providing a joint between adjacent building panels, comprising:

each of said building panels including a first edge and a second edge such that the first edge of each of said building panels forms a first mechanical connection with the second edge of an adjacent one of the building panels locking the first and second edges of the building panels to each other in a first direction at right angles to a principal plane of the panels, and a locking device arranged on a rear side of the building panels forming a second mechanical connection locking the building panels to each other in a second direction parallel to the principal plane and at right angles to the first and second edges, said locking device fitting within a locking groove extending parallel to and spaced apart from the first edge of said building panels, and which locking groove is open at the rear side of the building panels, the locking device comprising a strip integrated with the second edge of each of said building panels, said strip extending throughout substantially an entire length of the second edge and being provided with a locking element projecting from the strip, such that when two adjacent building panels are joined together, the strip projects from the rear side of the second edge of the panels with its locking element received in the locking groove of an adjacent building panel, the first and the second mechanical connection both allow mutual displacement of the building panels in a direction of the first and second edges, and the second mechanical connection enables the locking element to leave the locking groove if the respective building panel is turned about its first edge angularly away from the strip.

23. A system for providing a joint between adjacent building panels, comprising:

each of said building panels including a first edge and a second edge such that the first edge of each of said building panels forms a first mechanical connection with the second edge of an adjacent one of the building panels locking the first and second edges of the building panels to each other in a first direction at right angles to a principal plane of the panels, and a locking device arranged on a rear side of the building panels forming a second mechanical connection locking the building panels to each other in a second direction parallel to the principal plane and at right angles to the first and second edges, said locking device fitting within a locking groove extending parallel to and spaced apart from the first edge of said building panels, and which locking groove is open at the rear side of the building panels, the locking device comprising a strip integrated with the second edge of each of said building panels, said strip being provided with a locking element projecting from the strip, such that when two adjacent building panels are joined together, the strip projects from the rear side of the second edge of the panels with its locking element received in the locking groove of an adjacent building panel, the first and the second mechanical connections both allow mutual displacement of the building panels in a direction of the first and second edges, and the second mechanical connection enables the locking element to leave the locking groove if the respective building panel is turned about its first edge angularly away from the strip;

wherein the strip is mounted in an equalizing groove which is countersunk in the rear side of each of the building panels and exhibits an exact, predetermined distance from its bottom to the front side of the panel, the part of the strip projecting behind the adjacent panel engages a corresponding [equalising] *equalizing* groove which is countersunk in the rear side of the adjacent panel and which exhibits the same exact, predetermined distance from its bottom to the front side of the adjacent panel, and the strip has at least such a thickness that the rear side of the strip is flush with the rear sides of the panels.

*24. A system as claimed in claim 22, wherein the strip is made of a material different from that of the building panel and fixedly mounted on the building panel at the factory.*

*25. A system as claimed in claim 24, wherein the strip is fixed to the building panel by means of a mechanical connection.*

*26. A system as claimed in claim 25, wherein the mechanical connection between the strip and the building panel comprises a gripping edge defined by two recesses in the rear side of the building panel, and tongues or lips, which are bent or punched from the strip and which press against opposite outer sides of the gripping edge.*

*27. A system as claimed in claim 25, wherein the mechanical connection between the strip and the building panel comprises a recess in the rear side of the panel, and tongues or lips, which are bent or punched from the strip and which press against opposing inner sides of the recess.*

*28. A system as claimed in claim 24, wherein the strip is fixed to the building panel by means of a binder.*

*29. A system as claimed in claim 24, wherein the strip is made of a flexible resilient material.*

*30. A system as claimed in claim 24, wherein the strip is made of sheet aluminum.*

*31. The system of claim 19, wherein the sealing means is a rubber strip.*

*32. The system of claim 19, wherein the sealing means is a sealing compound.*

*33. A system for providing a joint between adjacent building panels, comprising:*

*each of said building panels including a first edge and a second edge such that the first edge of each of said building panels forms a first mechanical connection with the second edge of an adjacent one of the building panels locking the first and second edges of the building panels to each other in a first direction at right angles to a principal plane of the panels, and*

*a locking device arranged on a rear side of the building panels forming a second mechanical connection locking the building panels to each other in a second direction parallel to the principal plane and at right angles to the first and second edges, said locking device fitting within a locking groove extending parallel to and spaced apart from the first edge of said building panels, and which locking groove is open at the rear side of the building panels,*

*the locking device comprising a strip formed at the second edge of each of said building panels, said strip extending throughout substantially an entire length of the second edge and being provided with a locking element projecting from the strip, such that when two adjacent building panels are joined together, the strip projects from the rear side of the second edge of the panels with its locking element received in the locking groove of an adjacent building panel, and*

*the locking groove and the locking element being dimensioned such that when adjacent panels are joined*

*together and the locking element is received within the locking groove, there is sufficient space within the locking groove to allow mutual displacement of the adjacent panels in a direction of the first and second edges and to enable the locking element to leave the locking groove if the respective building panel is turned about its first edge angularly away from the locking strip.*

*34. A system as claimed in claim 33, wherein the panels are rectangular and intended, at each of their four edges, to be joined to a similar panel by a first mechanical connection of the aforementioned type and a second mechanical connection of the aforementioned type, each panel having a first pair of first and second edges, one of which is provided with a strip of the aforementioned type and the other of which is provided with a locking groove of the aforementioned type, and a second pair of opposite first and second edges, one of which is provided with a strip of the aforementioned type and the other of which is provided with a locking groove of the aforementioned type.*

*35. A system as claimed in claim 33, wherein the strip is made of a material that is different than a remainder of the building panel.*

*36. A system as claimed in claim 35, wherein the strip is made of aluminum.*

*37. A system as claimed in claim 33, wherein the strip is made of a same material as a remainder of the building panel, and the strip is integrally formed with the building panel.*

*38. A system as claimed in claim 33, wherein the strip is fixed to the building panel by means of a mechanical connection.*

*39. A system as claimed in claim 38, wherein the mechanical connection between the strip and the building panel comprises a gripping edge defined by two recesses in the rear side of the building panel, and tongues or lips, which are bent or punched from the strip and which press against opposite outer sides of the gripping edge.*

*40. A system as claimed in claim 38, wherein the mechanical connection between the strip and the building panel comprises a recess in the rear side of the panel, and tongues or lips, which are bent or punched from the strip and which press against opposing inner sides of the recess.*

*41. A system as claimed in claim 33, wherein the strip is fixed to the building panel by means of a binder.*

*42. A system as claimed in claim 33, wherein the strip is made of a flexible resilient material.*

*43. The system of claim 13, wherein the strip is made of sheet aluminum.*

* * * * *